(12) United States Patent
Loow et al.

(10) Patent No.: US 12,605,981 B2
(45) Date of Patent: Apr. 21, 2026

(54) VEHICLE DAMPER EXTENSION

(71) Applicant: Öhlins USA Inc., Hendersonville, NC (US)

(72) Inventors: Christer Loow, Hendersonville, NC (US); Melvin Alberto Chacon, Hendersonville, NC (US)

(73) Assignee: Öhlins USA Inc., Hendersonville, NC (US)

( * ) Notice: Subject to any disclaimer, the term of this patent is extended or adjusted under 35 U.S.C. 154(b) by 548 days.

(21) Appl. No.: 18/154,443

(22) Filed: Jan. 13, 2023

(65) Prior Publication Data

US 2024/0239149 A1 Jul. 18, 2024

(51) Int. Cl.
B60G 15/06 (2006.01)
B60G 17/02 (2006.01)

(52) U.S. Cl.
CPC ......... B60G 15/062 (2013.01); B60G 17/021 (2013.01); *B60G 2202/413* (2013.01)

(58) Field of Classification Search
CPC ........ B60G 15/062–063; B60G 17/201; B60G 2202/413; B60G 2202/24; B60G 2206/41; B60G 2500/10; B60G 2500/30; F16F 1/121; F16F 9/56
See application file for complete search history.

(56) References Cited

U.S. PATENT DOCUMENTS

| | | | |
|---|---|---|---|
| 4,154,461 A | 5/1979 | Schnittger | |
| 4,821,983 A | 4/1989 | Aubry et al. | |
| 5,009,451 A | 4/1991 | Hayashi et al. | |
| 5,348,112 A | 9/1994 | Vaillancourt | |
| 5,950,996 A * | 9/1999 | Pradel .................. | B60G 17/005 267/221 |
| 7,364,142 B2 | 4/2008 | Beck | |
| 7,766,136 B2 | 8/2010 | Runkel | |
| 8,262,100 B2 | 9/2012 | Thomas | |
| 8,469,164 B2 | 6/2013 | Kondo et al. | |
| 8,616,563 B2 | 12/2013 | Lee | |
| 9,068,616 B1 | 6/2015 | Serbu | |
| 9,180,746 B2 | 11/2015 | Kasuga et al. | |
| 9,669,674 B2 | 6/2017 | Luczak et al. | |
| 11,351,835 B2 | 6/2022 | Son | |
| 11,511,591 B2 | 11/2022 | Park | |
| 12,179,542 B2 | 12/2024 | Muller | |

(Continued)

FOREIGN PATENT DOCUMENTS

| | | |
|---|---|---|
| CN | 204322979 U | 5/2015 |
| CN | 113883206 A | 1/2022 |

(Continued)

*Primary Examiner* — David R Morris

(74) *Attorney, Agent, or Firm* — Kagan Binder, PLLC

(57) ABSTRACT

A damper assembly includes a first cylinder defining a first chamber and a second cylinder defining a second chamber. The damper assembly includes a piston rod extending from within the first chamber along an axis to the second cylinder. The damper assembly includes a piston fixed to the piston rod and movable within the first chamber along the axis. The damper assembly includes a plunger movable within the second chamber along the axis from a compact position to an extended position. The damper assembly includes a coil spring surrounding the first cylinder and the second cylinder.

16 Claims, 4 Drawing Sheets

(56) References Cited

U.S. PATENT DOCUMENTS

| | | | | |
|---|---|---|---|---|
| 2006/0213733 A1* | 9/2006 | Masaki | ............... | B60G 15/063 |
| | | | | 188/299.1 |
| 2009/0065314 A1 | 3/2009 | Kondo et al. | | |
| 2013/0221626 A1 | 8/2013 | Lee | | |
| 2016/0263958 A1* | 9/2016 | Murakami | ........... | F16F 15/002 |
| 2021/0061044 A1 | 3/2021 | Park | | |
| 2021/0061045 A1 | 3/2021 | Son | | |
| 2022/0203801 A1 | 6/2022 | Navarrete | | |
| 2022/0379677 A1 | 12/2022 | Lusso et al. | | |
| 2023/0150333 A1 | 5/2023 | Hirani et al. | | |
| 2024/0262154 A1 | 8/2024 | Loow et al. | | |
| 2024/0336105 A1 | 10/2024 | Muller | | |

FOREIGN PATENT DOCUMENTS

| | | | |
|---|---|---|---|
| CN | 114599898 A | 6/2022 |
| CN | 114435053 A | 5/2025 |
| WO | 2008087660 A1 | 7/2008 |
| WO | 2020077728 A1 | 4/2020 |

* cited by examiner

VEHICLE DAMPER EXTENSION

FIELD

The present disclosure generally relates to vehicle dampers. More particularly, the present disclosure relates to a vehicle damper with a variable length to adjust a ride height of a vehicle.

BACKGROUND

Dampers for vehicles are commonly included in a wide variety of vehicle segments. Some vehicles include semi-active damping that adjusts damping levels according to road conditions and vehicle dynamics. The dampers are between a body and the suspension system of the vehicle. A piston is located within the damper. The piston is connected to the vehicle body or the suspension of the vehicle through a piston rod. As the damper is compressed or extended, fluid flows between rebound and compression working chambers within the damper to counteract vibrations. By adjusting the flow of damping fluid between the chambers, greater or lower damping forces may be generated.

DETAILED DESCRIPTION

A damper assembly of the present disclosure includes a first cylinder defining a first chamber and a second cylinder defining a second chamber. The damper assembly includes a piston rod extending from within the first chamber along an axis to the second cylinder. The piston rod is movable relative to the second cylinder and may be sealed to the second cylinder. The damper assembly includes a piston fixed to the piston rod and movable within the first chamber along the axis. The damper assembly includes a plunger movable within the second chamber along the axis from a compact position to an extended position. The damper assembly may include a coil spring surrounding the first cylinder and the second cylinder. Movement of the plunger toward the compact position or the extended position decrease or increase a length of the damper assembly, respectively, e.g., to control a ride height of a vehicle having the damper assembly. The piston rod sealed to the second cylinder and/or the coil spring surrounding the first cylinder and the second cylinder may provide improved packaging and assembly characteristics, e.g., relative to conventional vehicle ride height control systems.

Figure 1:
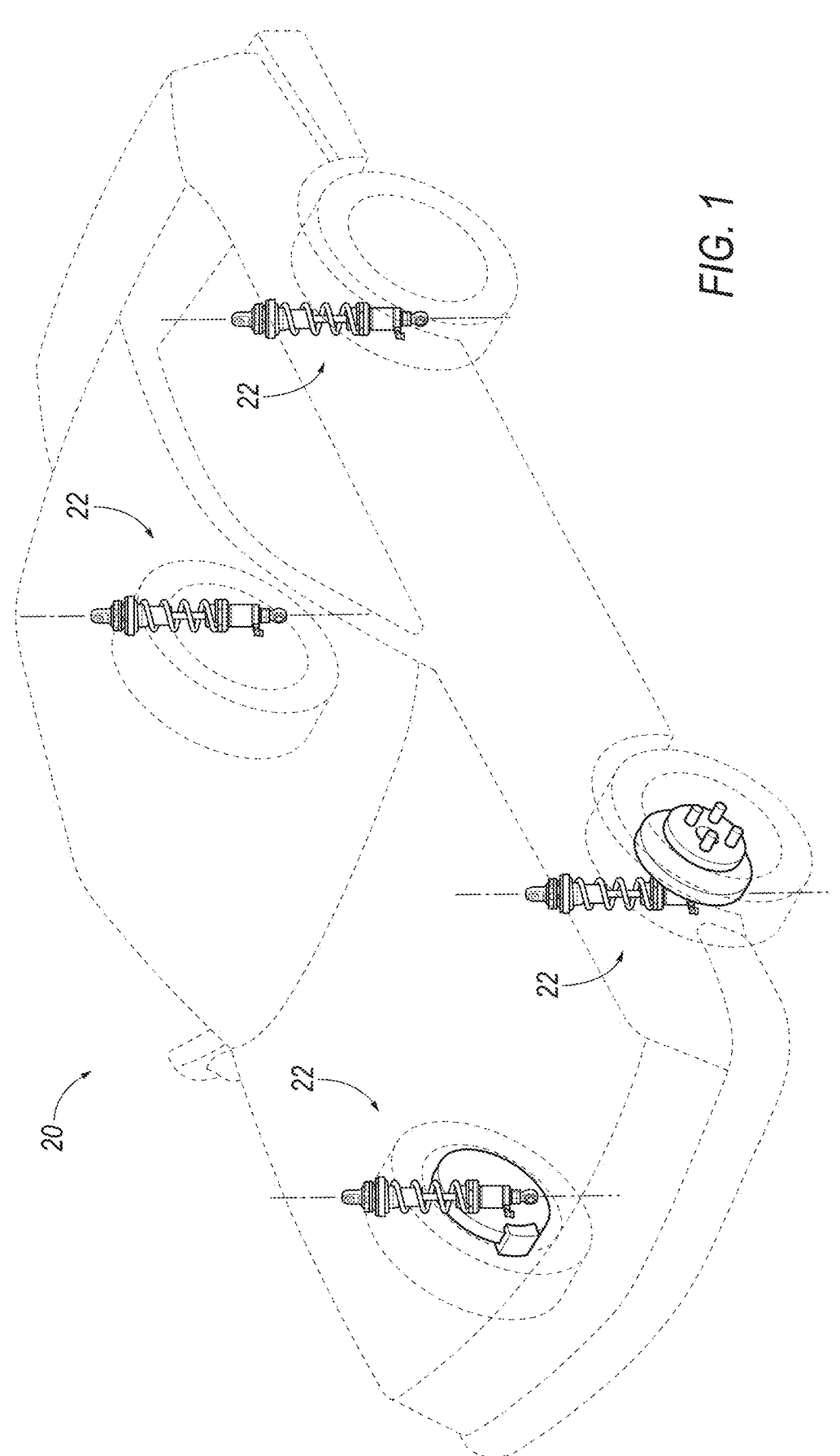
FIG. 1 is a schematic illustration of a vehicle including a suspension system having a plurality of damper assemblies.

With reference to FIG. 1, and wherein like numerals indicate like parts throughout the several views, a vehicle 20 having a plurality of exemplary damper assemblies 22 is shown. Each damper assembly 22 may continuously adjust damping levels according to road conditions and vehicle dynamics to dampen shocks and vibrations from variations in the road surface felt by occupants of the vehicle 20. The performance of the damper assembly 22 maybe electronically controlled, e.g., with damping levels controlled by an electronic control unit (not shown). The damper assembly 22 maybe elongated along an axis DA.

The vehicle 20 maybe any suitable type of ground vehicle, e.g., a passenger or commercial automobile such as a sedan, a coupe, a truck, a sport utility, a crossover, a van, a minivan, a taxi, a bus, etc. During normal operation of the vehicle 20, damper assemblies 22 at the front and/or rear of the vehicle 20 may extend and retract.

Figure 2:
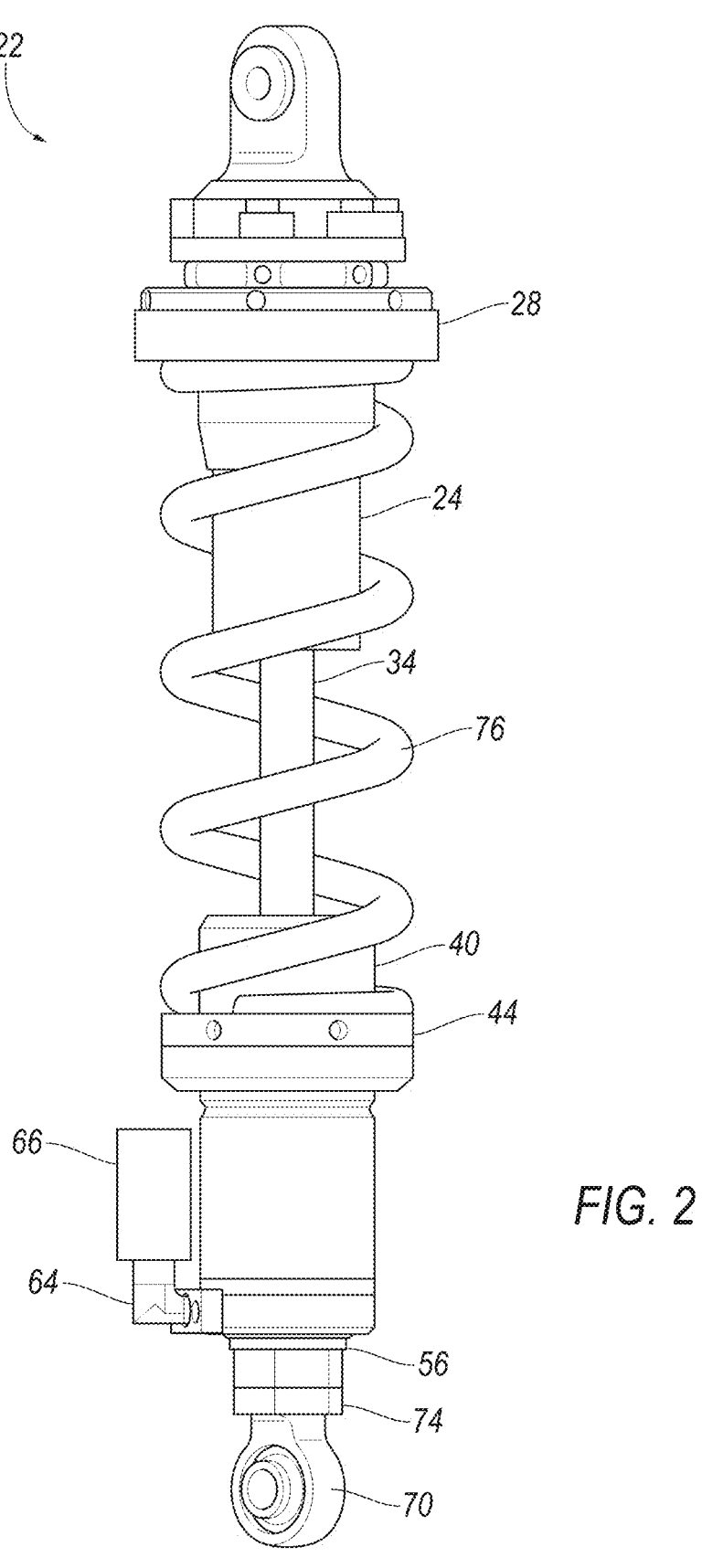
FIG. 2 is a perspective view a damper assembly.
Figure 3:
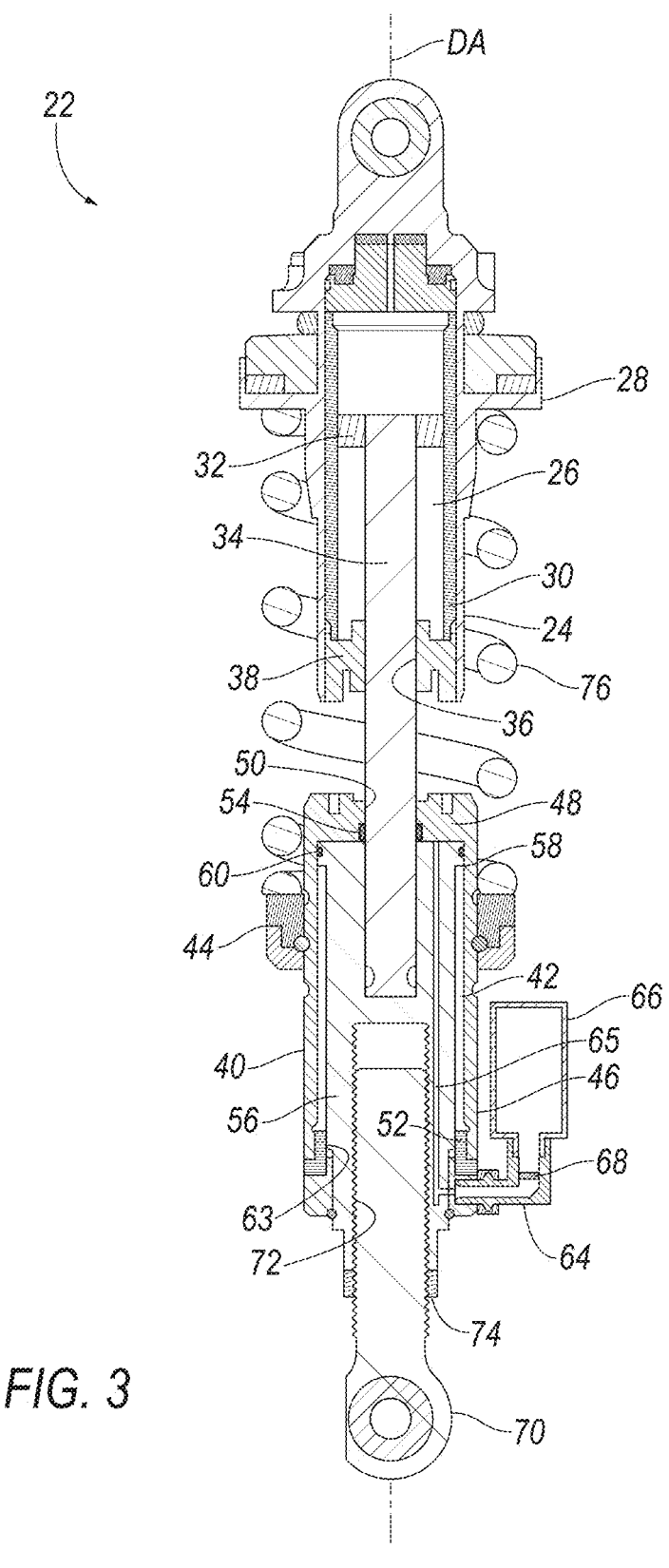
FIG. 3 is a cross-sectional view of the damper assembly in a compact position.
Figure 4:
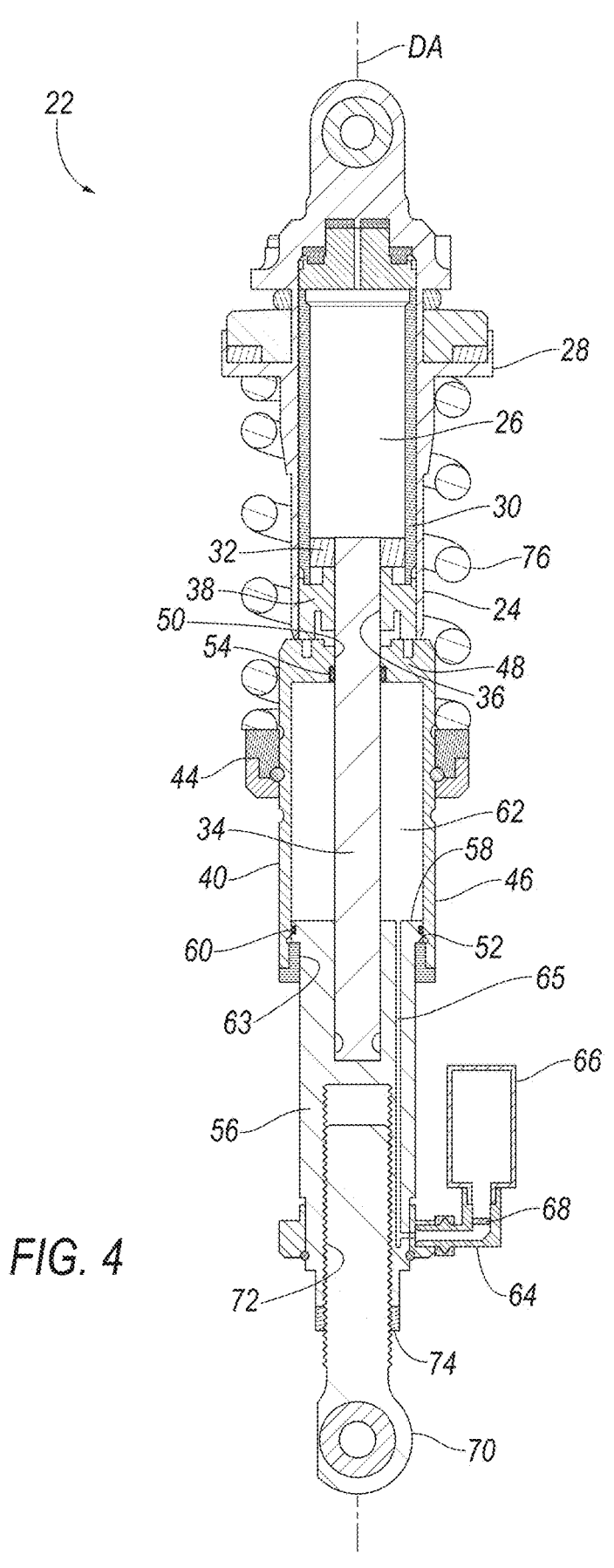
FIG. 4 is a cross-sectional view of the damper assembly in an extended position.

With reference to FIGS. 2-4, the damper assembly 22 includes a first cylinder 24 that defines a first chamber 26. The first chamber 26 maybe surrounded by the first cylinder 24 and between opposing distal ends of the first cylinder 24. The first cylinder 24 may include a first flange 28. The first flange 28 may be extended radially outward relative to the axis DA and away from the first chamber 26. The first flange 28 may surround the first chamber 26.

The damper assembly 22 may include one of more internal tubes 30 disposed in the first cylinder 24. The internal tubes 30 may be concentric. The internal tubes 30 may define, e.g., a central working chamber and a reservoir chamber surrounding the working chamber. The first cylinder 24, including the working chamber and the reservoir chamber contain a working fluid, e.g., a liquid such as hydraulic oil. The flow of working fluid in the first cylinder 24, e.g., between the working chamber and the reservoir chamber contain may be controlled with active electronic valves and/or passive mechanical valves.

The damper assembly 22 includes a piston assembly having a piston 32 and a piston rod 34. The piston 32 is fixed to the piston rod 34 and movable within the first chamber 26 along the axis DA. For example, the piston 32 maybe slidable along the axis DA within the working chamber. The damper assembly 22 may include one or more passages, valves, etc., that control fluid flow from one side of the piston 32 to the other. The piston rod 34 extends from within first chamber 26 along the axis DA. The piston rod 34 may extend along the axis DA from the piston 32 to external of the first chamber 26, e.g., via a first opening 36 of a first end cap 38 of the first cylinder 24. The piston rod 34 is movable relative to the first cylinder 24. For example, the piston rod 34 may be slidable within the first opening 36 and move along the axis DA concurrent with the piston 32.

The damper assembly 22 include a second cylinder 40 that defines a second chamber 42. The second chamber 42 maybe surrounded by the second cylinder 40 and between opposing distal ends of the second cylinder 40. The second cylinder 40 includes a second flange 44. The second flange 44 extend radially outward relative to the axis DA and away from a main body 46 of the second cylinder 40. The main body 46 may surround the second chamber 42, e.g., the main body 46 maybe tubular. The second flange 44 may surround the main body 46. The second cylinder 40 may include a second end cap 48 that encloses the second camber at a distal end of the main body 46. The second end cap 48 may include a second opening 50. The second end cap 48 may be fixed to the main body 46, e.g., via weld, treaded engagement, etc. The second end cap 48 and the main body 46 maybe unitary. Unitary means a single, uniform piece of material with no seams, joints, fasteners, or adhesives holding it together, i.e., formed together simultaneously as a single continuous unit, e.g., by machining from a monolithic blank, molding, forging, casting, etc. Non-unitary components, in contrast, are formed separately and subsequently assembled, e.g., by threaded engagement, welding, etc. The second cylinder 40 may include a third flange 52. The third flange 52 may extend from the main body 46 radially inward relative to the axis DA. The third flange 52 may be opposite the second end cap 48, e.g., at an opposing distal end of the main body 46. The third flange 52 may be fixed to the main body 46. The third flange 52 and the main body 46 may be unitary.

The piston rod 34 extends along the axis DA away from the first cylinder 24 to the second cylinder 40, e.g., to within the second chamber 42. For example, the piston rod 34 may extend along the axis DA from external of the second chamber 42 to internal of the second chamber 42 via the second opening 50 of the second end cap 48. The piston rod 34 is movable relative to the second cylinder 40. For example, the piston 32 maybe slidable within the second opening 50 along the axis DA.

The piston rod 34 is sealed to the second cylinder 40 to restrict fluid flow out of the second chamber 42. The piston rod 34 may be sealed to the second cylinder 40 at the second opening 50 of the second end cap 48. For example, an O-ring 54 may seal the piston rod 34 to the second cylinder 40. The O-ring 54 may surround the piston rod 34. The O-ring 54 may be disposed between the piston rod 34 and the second end cap 48 radially relative to the axis DA.

The damper assembly 22 includes a plunger 56 that is movable within the second chamber 42 along the axis DA. Movement of the plunger 56 varies a length of the damper assembly 22, e.g., to control a ride height of the vehicle 20. The plunger 56 may include a fourth flange 58. The fourth flange 58 may extend radially outward, e.g., toward the main body 46 of the second cylinder 40. The plunger 56 maybe sealed to the second cylinder 40. For example, an O-ring 60 may seal an outer perimeter of the fourth flange 58 to an inside surface of the main body 46 of the second cylinder 40. The plunger 56 and the second cylinder 40 may define a volume 62 within the second chamber 42, e.g., between the plunger 56 and the second end cap 48. The plunger 56 may extend out of the second chamber 42, e.g., via an opening 63 surrounded by the third flange 52. The piston rod 34 maybe fixed to the plunger 56, e.g., at the end of the plunger 56 having the fourth flange 58, to inhibit relative movement there between. The plunger 56 and the piston 32 may concurrently move relative to the second cylinder 40. The plunger 56 may extend away from the second cylinder 40 opposite the piston rod 34. For example, the piston rod 34 may extend away from the second cylinder 40 along the axis DA in a first direction and the plunger 56 may extend away from the second cylinder 40 along the axis DA in a second direction opposite the first direction.

The plunger 56 is movable from a compact position, shown in FIG. 3, to an extended position, shown in FIG. 4, and vice versa. The damper assembly 22 is longer, e.g., provides greater ride height, at the extended position than at the compact position. The piston 32 may be further from the first end cap 38 at the compact position than at the extended position. The volume 62 defined by the plunger 56 and the second end cap 48 maybe greater at the extended position than at the compact position. With reference to FIG. 3, the first cylinder 24 is spaced from the second cylinder 40 along the axis DA when the plunger 56 is at the compact position. For example, the first end cap 38 of first cylinder 24 maybe spaced from the second end cap 48 of the second cylinder 40 at the compact position. The third flange 52 may be spaced from the fourth flange 58 along the axis DA at the compact position. With reference to FIG. 4, the first cylinder 24 may abut the second cylinder 40 when the plunger 56 is at the extended position. For example, the first end cap 38 of first cylinder 24 may abut the second end cap 48 of the second cylinder 40 at the extended position. The third flange 52 may abut the fourth flange 58 at the extended position.

The plunger 56 includes a port 64 in fluid communication with the second chamber 42 to permit fluid flow into and/or out of the second chamber 42, e.g., into or out of the volume 62 defined between the plunger 56 and the second end cap 48. For example, an internal passage 65 may be defined by the plunger 56 between the port 64 and an end of the plunger 56 having the fourth flange 58. The internal passage 65 may be open to the volume 62 between the plunger 56 and the second end cap 48. Fluid flow into the port 64 may cause an increase in size of the volume 62 and move the plunger 56 toward the extended position. Fluid flow out of the port 64 may permit a decrease in size of the volume 62 and move the plunger 56 toward the compact position.

A canister 66 for storing, e.g., pressurized fluid, may be fluidly connected to port 64 to provide such fluid to the second chamber 42, e.g., to the volume 62. The canister 66 may store fluid at sufficient pressure to move the plunger 56 to the extended position. For example, the canister 66 may store air at sufficient pressure to raise the ride height of the vehicle 20 when the pressurized air is permitted to flow into the port 64. The canister may store ambient air, nitrogen, other pressurized gas. As another example, the pressurized fluid may be a pressurized liquid such as hydraulic fluid for providing to the volume 62. The damper assembly 22 may include a valve 68 connecting the canister 66 to the port 64. The valve 68 may by movable to a closed position where fluid is inhibited from flowing out of the port 64 or the canister 66, e.g., to maintain the plunger 56 at a current position. The valve 68 may be movable to a fill position where fluid is permitted to flow from the canister 66 to the port 64, e.g., to move the plunger 56 toward the extended position. The valve 68 may be movable to a bleed position in which fluid is permitted to flow out of the port 64, e.g., to move the plunger 56 toward the compact position. The valve 68 may move to the various positions in response to a command from a computer of the vehicle 20, e.g., an electronic control unit that controls the suspension system. The valve 68 may be manually operated, e.g., via mechanical linkage (not shown) accessible to an operator of the vehicle 20. The valve 68 maybe, for example, a solenoid valve, a ball valve, or any suitable type, including those conventionally known. The canister 66 may be fiberglass or any suitable material sufficient to hold the pressurized fluid. A pressurized accumulator for hydraulic fluid, an on board air compressor, hydraulic pump or the like (not shown) may be connected to the canister 66.

The damper assembly 22 may include an eyelet 70 fixed to the plunger 56. The eyelet 70 enables the damper assembly 22 to be connected to vehicle 20 body, suspension, or another component. The eyelet 70 may be threadedly engaged with the plunger 56, e.g., such that rotation of the eyelet 70 relative to the plunger 56 in one direction increases the length of the damper assembly 22 and rotation of the eyelet 70 in an opposite direction decreases the length. In other words, the eyelet 70 and the plunger 56 may have threads 72 engaged with each other. A lock nut 74 maybe engaged with threads of the eyelet 70 and tightened in abutment with the plunger 56 to maintain the position of the eyelet 70 relative to the plunger 56.

A coil spring 76 surrounds the piston rod 34, the first cylinder 24 and the second cylinder 40 and urges the first cylinder 24 and the second cylinder 40 away from each other along the axis DA. For example, the coil spring 76 may extend from the first flange 28 to the second flange 44. The coil spring 76 may abut both the first flange 28 and the second flange 44. The coil spring 76 maybe compressed between the first flange 28 and the second flange 44. The coil spring 76 maybe more compressed when the plunger 56 is at the extended position than at the compact position. In other words, the coil spring 76 urges the first flange 28 away from the second flange 44, e.g., extending the damper assembly 22.

The adjectives first, second, etc., are used throughout this document as identifiers and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A damper assembly, comprising:
a first cylinder defining a first chamber;
a second cylinder defining a second chamber;
a piston rod extending from within the first chamber along an axis to the second cylinder;
a piston fixed to the piston rod and movable within the first chamber along the axis;
a plunger movable within the second chamber along the axis from a compact position to an extended position; and
a coil spring surrounding the first cylinder and the second cylinder,
wherein the first cylinder is spaced from the second cylinder along the axis when the plunger is at the compact position, and
wherein the first cylinder abuts the second cylinder when the plunger is at the extended position.

2. The damper assembly of claim 1, wherein the first cylinder includes a first flange and the second cylinder includes a second flange, the coil spring extending from the first flange to the second flange.

3. The damper assembly of claim 1, wherein the piston rod is fixed to the plunger.

4. The damper assembly of claim 1, wherein the plunger includes a port in fluid communication with the second chamber.

5. The damper assembly of claim 4, further comprising a canister storing pressurized fluid, the canister fluidly connected to the port.

6. The damper assembly of claim 1, further comprising an eyelet fixed to the plunger.

7. The damper assembly of claim 6, wherein the eyelet is threadedly engaged with the plunger.

8. The damper assembly of claim 1, wherein the piston rod is sealed to the second cylinder.

9. A damper assembly, comprising:
a first cylinder defining a first chamber;
a second cylinder defining a second chamber;
a piston rod extending from within the first chamber along an axis to within the second chamber, the piston rod movable relative to the second cylinder and sealed to the second cylinder;
a piston fixed to the piston rod and movable within the first chamber along the axis; and
a plunger movable within the second chamber along the axis from a compact position to an extended position,
wherein the first cylinder is spaced from the second cylinder along the axis when the plunger is at the compact position, and
wherein the first cylinder abuts the second cylinder when the plunger is at the extended position.

10. The damper assembly of claim 9, wherein the piston rod extends away from the second cylinder along the axis in a first direction and the plunger extends away from the second cylinder along the axis in a second direction opposite the first direction.

11. The damper assembly of claim 9, further comprising an O-ring sealing the piston rod to the second cylinder.

12. The damper assembly of claim 9, wherein the piston rod is fixed to the plunger.

13. The damper assembly of claim 9, wherein the plunger includes a port in fluid communication with the second chamber.

14. The damper assembly of claim 13, further comprising a canister storing pressurized fluid, the canister fluidly connected to the port.

15. The damper assembly of claim 9, further comprising an eyelet fixed to the plunger.

16. The damper assembly of claim 15, wherein the eyelet is threadedly engaged with the plunger.

* * * * *